United States Patent [19]

Hicks

[11] Patent Number: 5,548,919
[45] Date of Patent: Aug. 27, 1996

[54] MINI-PLANAR TROLLING BOARD

[76] Inventor: Carl E. Hicks, 76200 True Rd., Armada, Mich. 48005

[21] Appl. No.: 498,754
[22] Filed: Jul. 6, 1995
[51] Int. Cl.$^6$ ...................................... A01K 91/00
[52] U.S. Cl. .......................................... 43/43.13; 43/43.14
[58] Field of Search ............... 43/43.14, 43.13, 43/43.1, 9.7

[56] References Cited

U.S. PATENT DOCUMENTS

| 2,924,907 | 2/1960 | Hamilton | 43/43.13 |
| 3,466,787 | 9/1969 | Collins | 43/43.13 |
| 3,507,068 | 4/1970 | Roberts | 43/17 |
| 3,748,775 | 7/1973 | Wagner | 43/43.13 |
| 3,943,653 | 3/1976 | Reckler | 43/43.14 |
| 3,949,512 | 4/1976 | Stegemeyer | 43/43.13 |
| 4,028,840 | 6/1977 | Wille | 43/43.13 |
| 4,079,539 | 3/1978 | Holstein | 43/43.13 |
| 4,524,538 | 6/1985 | Halvorsen | 43/43.13 |
| 4,602,451 | 7/1986 | Perez | 43/43.13 |
| 5,341,591 | 8/1994 | Hicks | 43/43.13 |

FOREIGN PATENT DOCUMENTS

| 953913 | 9/1974 | Canada | 43/43.13 |
| 0955494 | 1/1950 | France | 43/43.14 |

Primary Examiner—Jack W. Lavinder
Assistant Examiner—James Miner
Attorney, Agent, or Firm—Gifford, Krass, Groh, Sprinkle, Patmore, Anderson & Citkowski, P.C.

[57] ABSTRACT

A trolling assembly is shown using a single planar board having a buoyant body with weights that are adjustable for fishing on the port or starboard side of the boat. The fishing line is used to tow the assembly and to retrieve it when the catch is brought in. The fishing line is adjustably rigged for water conditions, matching the attack to the conditions.

4 Claims, 2 Drawing Sheets

MINI-PLANAR TROLLING BOARD

BACKGROUND OF THE INVENTION

1. Field of the Invention

This invention relates to a trolling assembly, and, more particularly, this invention relates to a compact single planar board trolling assembly uniquely designed to be adjustable for use on either side of a fishing boat.

2. State of the Prior Art

Numerous trolling or outrigger devices have been designed to support fishing lines laterally from a moving fishing boat. The devices are buoyant and are usually attached to the boat with a separate towing line and are designed to carry one or more fishing lines.

There are number of devices employing a pair of planar boards held in spaced relationship by pivotal linkage. In my U.S. Pat. No. 5,341,591, I describe an improved device employing three identical planar boards joined by a simple linkage which has improved stability when supporting a number of fishing lines along the tow line for the device.

SUMMARY OF THE PRESENT INVENTION

The trolling assembly of the present invention employs a single compact planar board equipped with a weight or weights which are positionally adjusted for trolling from the starboard or port side of a fishing boat. The assembly is towed by its fishing line which is held in a towing mode through a line release which a bite releases for reeling in with the board attached. The fishing line is adjustably secured to the rear of the planar board body to accommodate calm to rough conditions, decreasing the attack and pulling the assembly farther behind the boat.

The trolling assembly of the invention has a substantially rectangular, longitudinally extending planar board body having spaced parallel inboard and outboard longitudinally extending walls with a hollow interior portion. The body has a leading front edge tapering rearwardly from the outboard wall toward the inboard wall. The body has first and second spaced transverse walls between the inboard and outboard wall which defines a weight chamber and in which a rectangular weight is held in frictional contact with the walls. The weight is movable between longitudinally extending cap walls of the board to a position adjacent to one of the cap walls, as the bottom, when the board is disposed in water in a generally vertical position located on the port side of the boat, and it is adjustable to be adjacent the other cap wall, as the bottom, when the board is located on the starboard side of the boat.

BRIEF DESCRIPTION OF THE DRAWING

The advantages of the present invention will be more apparent from the following detailed description when considered in connection with the accompanying drawing wherein.

DETAILED DESCRIPTION OF THE PREFERRED EMBODIMENT

Figure 1:
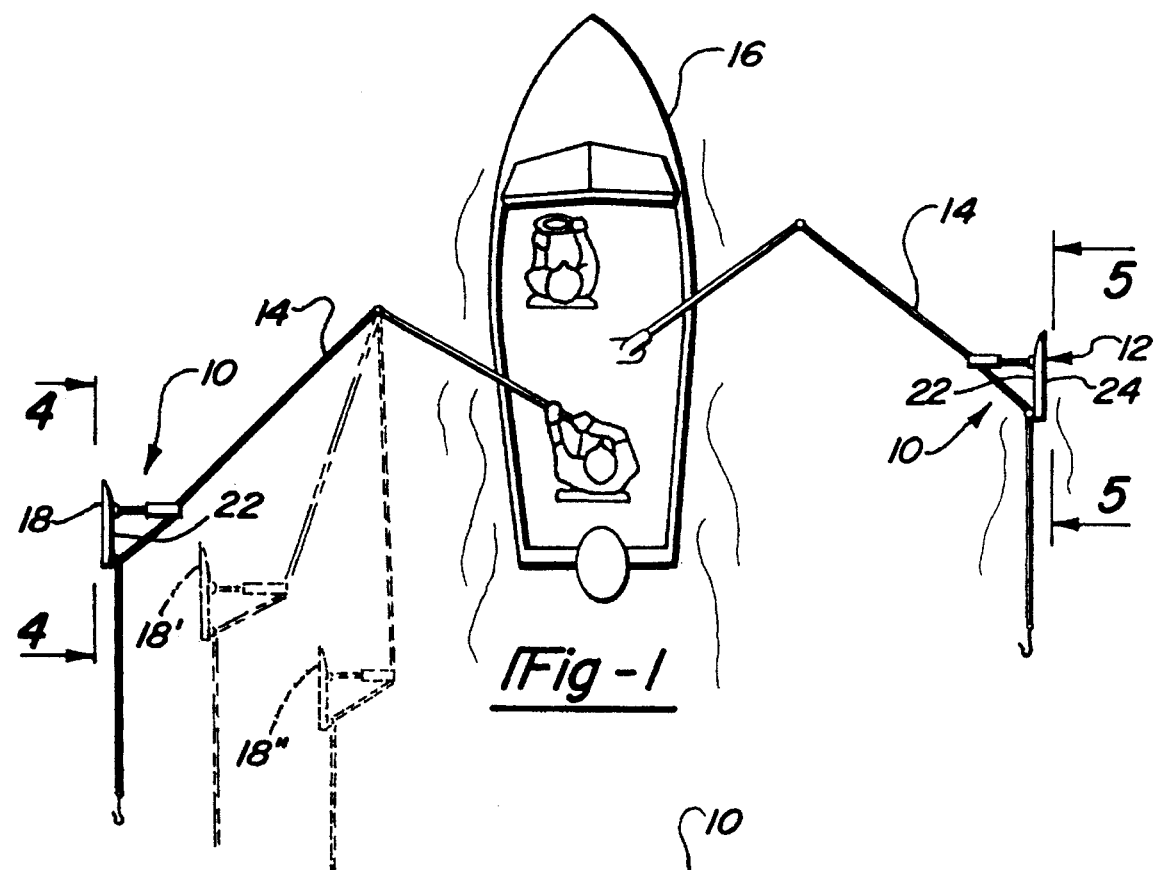
FIG. 1 is a plan view illustrating the use of the invention on either side of the boat under various water conditions.

Referring to FIG. 1, the trolling assembly 10 of the invention is shown at 12 being towed by fishing line 14 on the starboard side of the fishing boat 16 and is shown at 18 being towed a fishing line 14 on the port side of the fishing boat.

At 18 the trolling assembly has been rigged for ideal conditions with calm water allowing the most attack to pull the boat out laterally farthest from the boat and closest to the rear of the boat. The trolling assembly is shown in phantom at 18' on the port side of the boat rigged for normal conditions with moderate wave action using an intermediate attack putting the board farther behind the boat than at 18. The trolling assembly is likewise shown in phantom at 18" on the port side rigged for rough conditions with the least attack, pulling the board farthest behind the boat.

The body 20 of the planar trolling board assembly 10 has spaced parallel inboard and outboard walls 22 and 24 respectively with a leading forward edge or end 26 having a curved taper rearwardly from the outboard wall 24 to the inboard wall 22.

The body 20 has a hollow center 28 and spaced transverse walls 30 forming weight chambers 32 into which rectangular metal weights 34 are placed. The walls 30 also divide the balance of the hollow center 28 into compartments into which expanded plastic foam inserts 36, 38 and 40 are placed.

The weights 34 are less than the height of the planar board assembly and they frictionally engage the transverse divider walls 30. They can also frictionally engage the inboard wall 22 and outboard wall 24.

The body 20 of the trolling assembly 10 being formed with injection molded walls and having light inserts in its hollow interior is naturally buoyant, and to maintain it in a vertical position when it is in the water with stability, the weights 34 have to be located at the bottom edge. Which of the two longitudinally extending cap walls 42 and 44 is the bottom is determined by the side of the boat on which the trolling assembly is to be used. The leading curved tapered end 26 of the body 20 will always be facing inboard, tapering inwardly and rearwardly from the outboard body wall 24 toward the inbaord wall 22. This provides a positive attack carrying the trolling assembly away from the lateral side of the boat as it is being pulled through the water.

Figure 2:
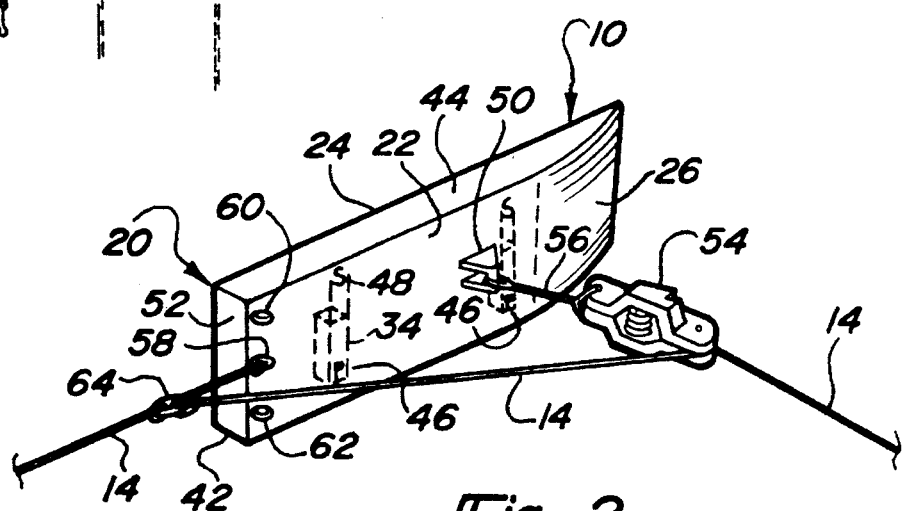
FIG. 2 is a perspective view of the planar board trolling assembly as it is attached to the fishing line for towing.
Figure 3:
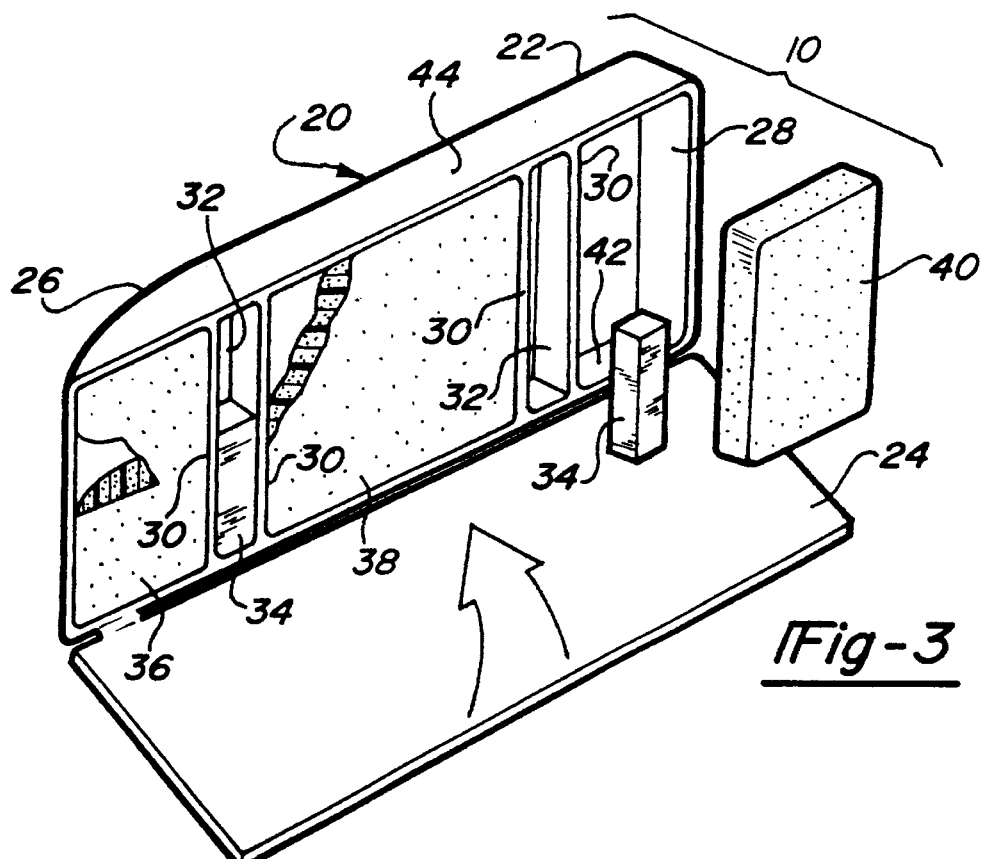
FIG. 3 is an exploded perspective view of the board showing the inside components.
Figure 4:
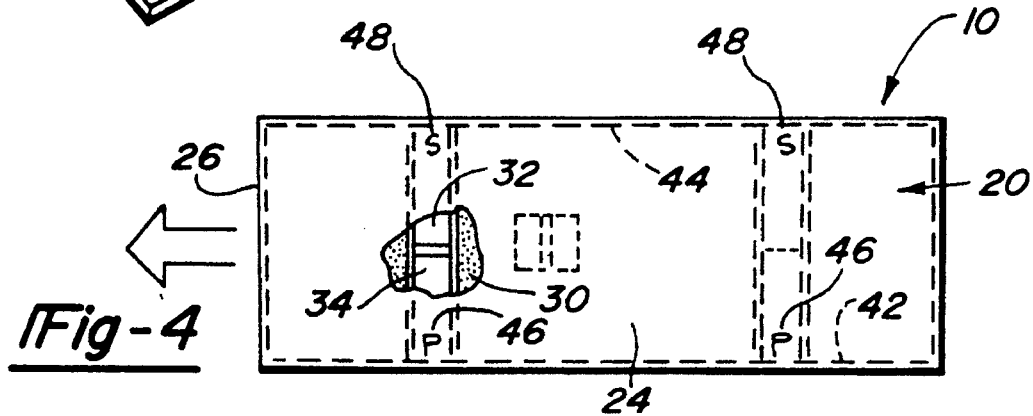
FIG. 4 is a side elevational view of the trolling assembly taken along line 4—4 of FIG. 1 showing the assembly being towed on the port side of a boat.

When the trolling assembly 10 is to be used and the port side is shown at 18 in FIG. 1, longitudinal cap wall 42 will be the bottom and 44 will be the top as shown in FIGS. 3 and 4. Tapping the bottom wall 22 on a solid surface will dislodge the weights to overcome the friction between weight and the divider walls 30 and inboard and outboard walls 22 and 24. The body 20 can be marked with an indicator such as P for port and S for starboard as shown at 46 and 48, respectively in FIGS. 2, 4 and 5 to indicate which cap wall will be the bottom and can be tapped to move the weight 34 adjacent that wall.

Figure 5:
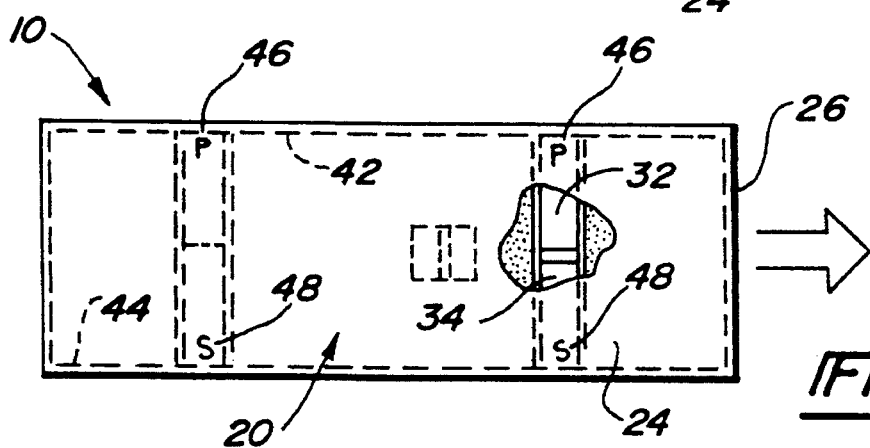
FIG. 5 is a view along line 5—5 of FIG. 1 showing the trolling assembly being drawn along the starboard side of the boat.

As seen in FIGS. 2, 3 and 4, the trolling assembly 10 is oriented for movement on the port side. The bottom wall 42, marked with the "P" indicator 46 can be tapped on a solid surface to lodge the weights 34 against the inside of that wall. Similarly, the trolling assembly 10 shown in FIG. 5 is oriented for movement on the starboard side, and the wall 42 is the bottom marked with the "S" indicator 48 which can be tapped against the solid surface to lodge the weights 34 against the inside of that wall.

As seen in FIG. 2, the inboard wall 22 of the planar board body 20 has a line or clip holder 50 located at mid-height and closer to the forward end 26 than to the rear end 52 of the board. A release 54 is moored to the line holder 50 with a connecting line 56. Also attached to the inboard side 22 adjacent the rear end 52 are three tail line guides or eyelets: a central eyelet 58 for use in normal conditions, a top eyelet 60 for use in rough conditions and a bottom eyelet 62 for use in slow ideal conditions. The fishing line 14 is rigged to tow the trolling assembly 10 by clamping the line from the boat to the release 54. Looping the line clamped in the release will keep the line from slipping and provide better hook setting. Next the line is secured to the eyelet selected for prevailing conditions, preferably by the use of a large swivel clip 64 shown attached to the central normal condition eyelet 58 in FIG. 2. The attachment of a line 14 to the selected eyelet 58, 60 or 62 will result in the trolling board being pulled as shown at 18, 18' and 18" in FIG. 2 as previously described. It will be appreciated that the top "rough conditions" eyelet 60 for port use will become the bottom "slow ideal conditions" eyelet for starboard use, and the bottom "slow ideal conditions" eyelet 62 for port use will become the top "rough conditions" eyelet for starboard use.

When there is a strike, the fishing line 14 will be released from the release 54 for working in the usual manner, with the lightweight trolling assembly being pulled in with the catch.

I claim:

1. A trolling assembly comprising:

a substantially rectangular, longitudinally extending, buoyant planar board body having spaced parallel inboard and outboard longitudinally extending walls with a hollow interior portion, said body having a leading front edge tapering rearwardly from said outboard wall toward said inboard wall;

said body having first and second spaced transverse walls between said inboard and outboard walls and spaced apart and longitudinally extending cap walls which together define at opposite ends of said transverse walls a weight chamber; and a rectangular weight in said chamber being held stationary by frictional contact with said first and second transverse walls and movable by jarring between said longitudinally extending cap walls, said weight being movable to a position adjacent one of said cap walls to define said one of said cap walls as a bottom when said body is disposed in water in a generally vertical position located on a port side of a boat, and said weight being movable to a position adjacent the other of said cap walls to define said other of said cap walls as a bottom, when said body is disposed in a generally vertical position located on the starboard side of a boat.

2. The trolling assembly according claim 1 wherein said first and second transverse walls define a first weight chamber containing a first rectangular weight and further including third and fourth spaced transverse walls defining a second weight chamber longitudinally spaced from said first weight chamber and containing a second rectangular weight for movement with said first weight.

3. The trolling assembly according to claim 1 further including a line release connected to said inboard wall at a mid-position, closer to said leading edge than to a rear edge of said body, and a tail line guide attached to said body adjacent said rear edge, whereby a fishing line from a boat is first secured to said line release and then secured to said tail line guide for towing said assembly.

4. The trolling assembly according to claim 3 including a plurality of tail line guides attached to said body at different heights so that said fishing line can be selectively threaded from said release through one of said guides for a slow calm, normal or rough condition to accordingly adjust the attack for the existing condition.

\* \* \* \* \*